Feb. 5, 1929.                                                      1,701,326
P. G. JOHNSON
PIPE JOINT
Filed July 28, 1927
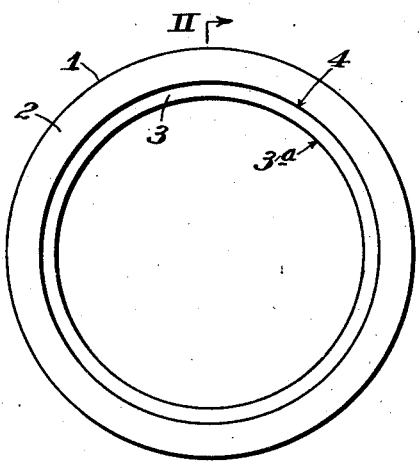
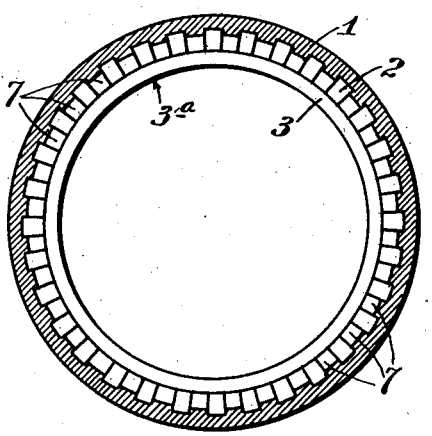
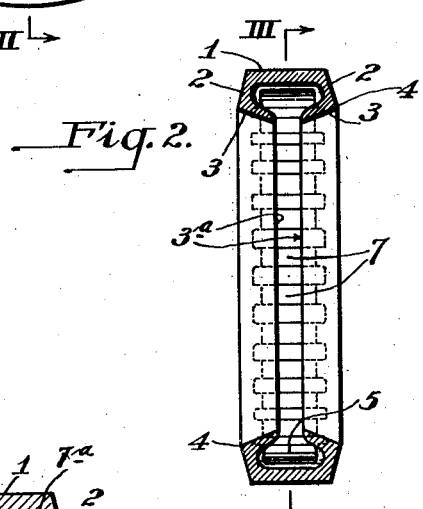
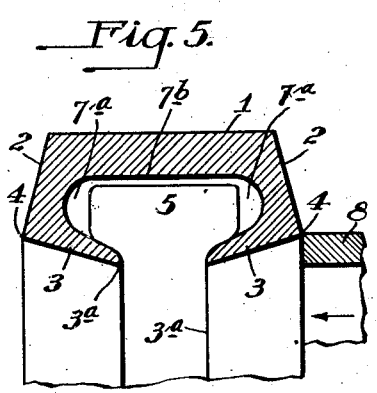
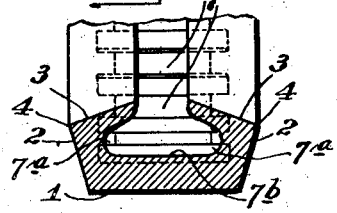
WITNESSES
INVENTOR
Percy Graham Johnson
by Brown & Critchlow
his attorneys Patented Feb. 5, 1929.

1,701,326

UNITED STATES PATENT OFFICE.

PERCY GRAHAM JOHNSON, OF LETCHWORTH, ENGLAND, ASSIGNOR TO THE VICTAULIC COMPANY, LIMITED, OF LONDON, ENGLAND.

PIPE JOINT.

Application filed July 28, 1927, Serial No. 208,939, and in Great Britain September 17, 1926.

This invention relates to pipe or like joints of the type disclosed in United States Patent No. 1,541,601 to E. Tribe.

In this type of joint, a leak preventing elastic ring having flexible inturned flanges is provided, the inner peripheral lips of the said flanges being of less diameter than the outer diameter of the pipes or the like to be joined so that when the ends of the pipes are pressed into the elastic ring, or, conversely, the elastic ring pressed over the pipes, the inner peripheral lips of the flexible flanges are deflected from their normal inturned position and are stretched outwards so as, by reaction, to embrace tightly and elastically the ends of the pipes or the like.

The object of the present invention is to effect an improvement upon leak preventing rings of the type aforesaid whereby the lips of the flexible inturned flanges are caused by greater reaction to grip on and press more firmly around the ends of the pipes or the like, and thereby initially seal the joint most effectively against both internal and external fluid pressure. The initial sealing is very important as if leakage takes place under the initial pressure of the fluid it is apt to continue as the pressure increases.

In referring to the "lips" of the flexible inturned flanges it is to be understood that the whole of the tapered extensions of the flanges which bed on to the ends of the pipes or the like is to be understood, and the "back" of the ring denotes that part of the periphery of the ring between the inturned side flanges.

According to the present invention, I provide a joint for pipes and the like, of the type stated, in which the leak preventing ring, made of rubber or other suitable elastic material, has formed, at its interior, a number of transverse ribs adapted to stiffen the lips and increase their resistance to deflection at the fitment of the same over the ends of the pipes or the like and, under reaction, due to their resilience, to cause them, when deflected, to grip tightly upon and around the said pipe or like ends and effectively prevent initial leakage.

The transverse ribs are preferably formed integral with the ring and are also preferably spaced apart at regular intervals, and they are shaped, at the sides, so as to form stiffening webs or struts adapted to support the flanges and their lips, the webs also serving to divide the interior of the ring, at each side, into compartments. The ribs may not extend entirely to the marginal edges of the lips of the flanges as it is not desired that they should interfere with the self sealing action of the thin and very flexible edge parts of the lips. The ribs act substantially as resilient arches tending to prevent deformation of the cross section of the ring.

In practice, the ring is made so that it requires to be stretched in order to fit over or receive the ends of the pipes or the like. The housing enshrouding the ring is also generally adapted to clamp the ring to the pipes or the like in such a manner that compression applied to the back and side surfaces of the ring causes the lips of the flexible inturned flanges to press firmly down upon the said ends. The formation of the lips is such that they will bed on to the pipes or like ends whatever be the amount of flexure permitted by the enshrouding housing.

The preferred embodiment of the invention is illustrated in the accompanying drawings, of which Fig. 1 is an elevation of the ring; Fig. 2 a transverse sectional view, the plane of view being indicated by the line II—II, Fig. 1; Fig. 3 a central sectional view, the plane of view being indicated by the line III—III, Fig. 2; Fig. 4 a fragmentary cross sectional view of the ring, the section being taken through one of the ribs; Fig. 5 a cross sectional view of the ring to enlarged scale showing it in normal form before being applied to the ends of pipes; and Fig. 6 a view corresponding to Fig. 5 showing the ring in dotted lines in its normal form, and in full lines in the form in which it is distorted when applied to pipes.

The ring, which is made of rubber or other suitable elastic material comprises a semi-rigid back portion 1 of substantially cylindrical form, which portion is provided, at each side, with a flexible inturned flange 2. As clearly shown in Figs. 3 and 4, the sides of the ring taper from the interior periphery towards the exterior periphery of the ring, each flange 2 being at an obtuse angle to the back portion 1. Each flange has an inward extension forming a flexible annular lip 3 of tapering shape, as shown, and terminates in a thin edge 3ᵃ. The lips 3 are deflected when the ring is fitted on to the pipes, and the pressure chamber 5, formed within the ring, allows the internal fluid pressure to act on the lips 3 to seal the joints (see Fig. 6).

The leak preventing ring shown in the annexed drawing, however, comprises also a series of integral ribs 7. These ribs are uniformly spaced apart around the interior of the ring at distances substantially equal to their widths, each rib being transverse to the plane of the ring and not extending to the marginal edges 3ª of the lips. More specifically each rib 7 comprises three portions, namely, two short, thick webs 7ª and a thinner connecting part 7ᵇ of equal breadth.

From the foregoing it will be clear that the flexibility of each lip 3 varies progressively from the outer edge 4 thereof to the inner edge 3ª. At its extreme outer edge each lip is comparatively rigid, being stiffened by the thick wall of the flange 2 connecting the lip 3 to the cylindrical portion 1. The highest degree of flexibility is present at the thin inner edge 3ª of the lip, the lip being gradually tapered and being normally held in the inwardly projecting position shown in Fig. 2 simply by the comparative rigidity of the remaining parts 1 and 2 of the ring. The lip is reinforced by the resilient web 7ª.

The internal diameter of the ring at the circumferential edge 4 is preferably made slightly smaller than the outside diameter of the pipe 8, and in such a construction the ring has first to be stretched before it can fit over the end of the pipe. In practice, the ring is made so that the amount of stretching required is approximately from 1/4" to 1/2" per foot bore of the ring.

Owing to the peculiar formation of the ring when it is being pressed over the pipe ends, or conversely, the pipe ends are pressed thereinto the deflection of the lips 3 from the position shown in dotted lines in Fig. 6, to the position shown in full lines, not only stretches the lips but also stretches the ring as a whole. This results in the ring being subjected to tension producing a constant reaction, due to the elasticity of the material, throwing a load from the semi-rigid back 1 upon the more flexible and compressible lips and side flanges and causing the said lips throughout their widths and all around the inner periphery of the ring to bed tightly and solidly upon the surfaces of the pipe ends and effectively prevent initial leakage both internally and externally.

Throughout the stretching and deflecting movements, the action of the ribs 7 is to resist any reduction in the cross-sectional area of the annular pressure chamber 5. In this manner, because there is pressure acting on all sides of the ring, the ribs 7 exert an equal and opposite reaction, which is universally distributed around the ring, thereby sealing all parts of the latter against either external or internal pressure.

It is to be understood, moreover, that the foregoing leak preventing closure is additional and not derogative to the self-acting closure effected by the fluid within (or without) the pipes. The sealing or closure at initial pressure is very important as when the joint is tight initially the succeeding pressure, no matter how great it may be, merely serves to make the closure more effective.

In the case of internal fluid presure, the fluid enters the annular chamber 5 in the usual manner and exerts pressure on the lips 3 as shown by the curved arrows in Fig. 6. Moreover the fluid enters the spaces or compartments between the webs 7ª of the ribs 7 so that fluid pressure is exerted on substantially the whole width of the lips 3 uniformly around the pipe ends. In the case of external fluid pressure (for example, when a vacuum is to be maintained inside the pipes being joined) the fluid, while it may pass below the bottom edge of the buttress side walls of the enshrouding housing, cannot pass between the edge 4 of the flange 2 and the adjacent surface of the pipe 8, as the whole lip 3 is tightly bedded on the pipe, but rather tends to increase the pressure between the said parts by acting on the outer inclined side surfaces of the ring.

I claim as my invention:

1. A flexible ring of the type described for forming a leak-preventing joint between the adjacent ends of two pipes, said ring comprising as a unitary structure a back and pipe-bedding lips extending inwardly from the back and forming with the back a reentrant fluid-receiving recess, said back having flanges connecting its outer portion to said lips, the pipe-bedding walls of said lips forming openings of smaller diameters than the diameters of the outer surfaces of the pipes to be received by them, and the interior wall of the ring being integrally provided with a plurality of transverse resilient ribs acting as struts upon the lips and between them and the flanges to increase the initial grip of the lips upon the ends of pipes to which the ring is applied.

2. A flexible ring of the type described for forming a leak-preventing joint between the adjacent ends of two pipes, said ring comprising as a unitary structure a back and pipe-bedding lips extending inwardly from the back and forming with the back a reentrant fluid-receiving recess, the pipe-bedding walls of said lips forming openings of smaller diameters than the diameters of the outer surfaces of the pipes to be received by them, and the interior walls of the ring being provided with a plurality of transverse ribs of greater depth at their ends than at their intermediate portions, said ribs stiffening said lips for increasing their internal grip upon the ends of pipes to which the ring is applied.

In testimony whereof, I sign my name.

PERCY GRAHAM JOHNSON.